(12) United States Patent
Dielissen

(10) Patent No.: US 7,978,693 B2
(45) Date of Patent: Jul. 12, 2011

(54) INTEGRATED CIRCUIT AND METHOD FOR PACKET SWITCHING CONTROL

(75) Inventor: Johannus Theodorus Matheus Hubertus Dielissen, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 464 days.

(21) Appl. No.: 10/598,552

(22) PCT Filed: Feb. 22, 2005

(86) PCT No.: PCT/IB2005/050643
§ 371 (c)(1),
(2), (4) Date: Jun. 13, 2007

(87) PCT Pub. No.: WO2005/088916
PCT Pub. Date: Sep. 22, 2005

(65) Prior Publication Data
US 2007/0253410 A1    Nov. 1, 2007

(30) Foreign Application Priority Data

Mar. 8, 2004   (EP) .................................. 04100931

(51) Int. Cl.
*H04L 12/28* (2006.01)
(52) U.S. Cl. ........................................ 370/389; 713/320
(58) Field of Classification Search ............. 713/320
See application file for complete search history.

(56) References Cited

U.S. PATENT DOCUMENTS

| | | | | |
|---|---|---|---|---|
| 5,572,736 A * | 11/1996 | Curran | ................. | 713/320 |
| 5,790,874 A * | 8/1998 | Takano et al. | ............. | 713/320 |
| 5,856,980 A * | 1/1999 | Doyle | ................. | 714/704 |
| 6,535,984 B1 * | 3/2003 | Hurd | ................. | 713/320 |
| 6,725,450 B1 * | 4/2004 | Takayama | ................. | 717/139 |
| 7,020,821 B2 * | 3/2006 | Chang | ................. | 714/746 |
| 2002/0186597 A1 * | 12/2002 | Henkel et al. | ................. | 365/200 |
| 2003/0212914 A1 * | 11/2003 | Webster et al. | ................. | 713/300 |
| 2004/0202190 A1 * | 10/2004 | Ricciulli | ................. | 370/410 |

(Continued)

FOREIGN PATENT DOCUMENTS
WO    02095574 A1    11/2002

(Continued)

OTHER PUBLICATIONS

Interface Exploration for reduced power in Core-Based systems, Tony Givargis, 1998 IEEE, pp. 117-122.*
Givargis Tony, interface Exploration for Reduced Power in Core-Based Systems, 1998 IEEE, pp. 117-122.*

(Continued)

*Primary Examiner* — Chi H Pham
*Assistant Examiner* — Kouroush Mohebbi

(57) ABSTRACT

An integrated circuit having a plurality of processing modules (M, S) and an interconnect means (N) for coupling said plurality of processing modules (M, S) and for enabling a packet based communication based on transactions between said plurality of processing modules (M, S) is provided. Each packet comprises a first predetermined number of subsequent words each having a second predetermined number of bits. A first of said plurality of processing modules (M) issues a transaction by sending at least one packet over said interconnect means (N) to a second of said plurality of processing modules (S). The integrated circuit further comprises at least one packet inspecting unit (PIU) for inspecting bits of said at least one packet to determine bits not required for said issued transaction and for matching said not required bits of said at least one inspected packet with other bits of the same packet.

3 Claims, 2 Drawing Sheets

U.S. PATENT DOCUMENTS

2005/0010830 A1* 1/2005 Webster .................. 713/320

FOREIGN PATENT DOCUMENTS

WO     WO 02095574 A1 * 11/2002

OTHER PUBLICATIONS

Figure 1:
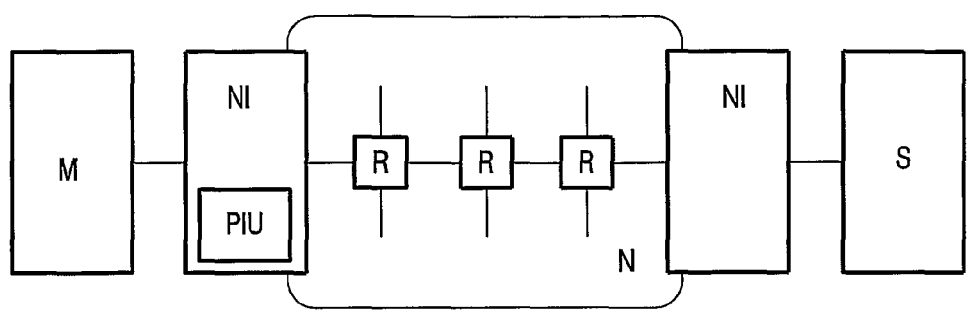

E. Rijpkema et al, "Trade Offs in the Design of a Router With Both Guaranteed and Best-Effort Services for Networks on Chip", Design, Automation and Test in Europe Conference NAD Exhibition, Mar. 3-7, 2003, Munich, German.

T.T. Ye et al, "Packetized On-Chip Interconnect Communication Analysis for MPSoC", Design Automation and Test in Europe, Proceedings, 2003, pp. 344-349.

J. Dielissen et al, "Concepts and Implemetation of the Philips Network-On-Chip", Internet Article, Nov. 2003, XP002330547, p. 1-6.

E. Rijpkema et al, "A Router Architecture for Networks on Silicon", Proceedings of Process 2001, 2nd Workshop on Embedded Systems.

* cited by examiner

INTEGRATED CIRCUIT AND METHOD FOR PACKET SWITCHING CONTROL

The invention relates to an integrated circuit having a plurality of processing modules and an interconnect means for coupling said plurality of processing and a method for packet switching control in such an integrated circuit.

Systems on silicon show a continuous increase in complexity due to the ever-increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the systems modules usually communicate to each other via a bus. As the number of modules increases however, this way of communication is no longer practical for the following reasons. On the one hand the large number of modules forms a too high bus load. On the other hand the bus forms a communication bottleneck as it enables only one device to send data to the bus.

A communication network forms an effective way to overcome these disadvantages. Networks on chip (NoC) have received considerable attention recently as a solution to the interconnect problem in highly complex chips. The reason is twofold. First, NoCs help resolve the electrical problems in new deep-submicron technologies, as they structure and manage global wires. At the same time they share wires, lowering their number and increasing their utilization. NoCs can also be energy efficient and reliable and are scalable compared to buses. Second, NoCs also decouple computation from communication, which is essential in managing the design of billion-transistor chips. NoCs achieve this decoupling because they are traditionally designed using protocol stacks, which provide well-defined interfaces separating communication service usage from service implementation.

Using networks for on-chip communication when designing systems on chip (SoC), however, raises a number of new issues that must be taken into account. This is because, in contrast to existing on-chip interconnects (e.g., buses, switches, or point-to-point wires), where the communicating modules are directly connected, in a NoC the modules communicate remotely via network nodes. As a result, interconnect arbitration changes from centralized to distributed, and issues like out-of order transactions, higher latencies, and end-to-end flow control must be handled either by the intellectual property block (IP) or by the network.

Most of these topics have been already the subject of research in the field of local and wide area networks (computer networks) and as an interconnect for parallel machine interconnect networks. Both are very much related to on-chip networks, and many of the results in those fields are also applicable on chip. However, NoC's premises are different from off-chip networks, and, therefore, most of the network design choices must be reevaluated. On-chip networks have different properties (e.g., tighter link synchronization) and constraints (e.g., higher memory cost) leading to different design choices, which ultimately affect the network services.

NoCs differ from off-chip networks mainly in their constraints and synchronization. For on-chip networks computation too comes at a relatively high cost compared to off-chip networks. An off-chip network interface usually contains a dedicated processor to implement the protocol stack up to network layer or even higher, to relieve the host processor from the communication processing. Including a dedicated processor in a network interface is not feasible on chip, as the size of the network interface will become comparable to or larger than the IP to be connected to the network. Moreover, running the protocol stack on the IP itself may also be not feasible, because often these IPs have one dedicated function only, and do not have the capabilities to run a network protocol stack.

The number of wires and pins to connect network components is an order of magnitude larger on chip than off chip. If they are not used massively for other purposes than NoC communication, they allow wide point-to-point interconnects (e.g., 300-bit links). This is not possible off-chip, where links are relatively narrower: 8-16 bits.

Introducing networks as on-chip interconnects radically changes the communication when compared to direct interconnects, such as buses or switches. This is because of the multi-hop nature of a network, where communication modules are not directly connected, but separated by one or more network nodes. This is in contrast with the prevalent existing interconnects (i.e., buses) where modules are directly connected. The implications of this change reside in the arbitration (which must change from centralized to distributed), and in the communication properties (e.g., ordering, or flow control).

With the increasing success of portable devices like mobile phones, PDA, notebooks, MP3-players or the like, the power consumption is becoming a very important issue within modern integrated circuits and the design thereof. As the VLSI design of such ICs is shifting into the nanometer domain, the energy which is dissipated by the interconnect in a system-on-chip becomes a significant part of the overall system power consumption.

The actual energy consumption of the interconnect, i.e. the network, is not only based on the physical properties of the interconnect, like the voltage swing, the wire delay, the topography of the interconnect or the like, but also on the data flow in the system-on-chip, i.e. the processor-processor communication and the processor-memory communication. This communication is usually transaction based and can be of the following origins: cache and memory transactions (data fetch from shared memory), cache coherence operations (updated data in a shared memory must be updated in all cache copies resulting in synchronization traffic), packet segmentation overheads (segmenting dataflow into packets will introduce an additional data overhead) or contentions between packets (re-routing packets in case of a contention).

Typically, the above packets in the system on chip comprise a header containing the destination address, the source address and the requested operation like, READ, WRITE, INVALIDATE etc. The payload of a packet comprises the data to be transported. Optionally, a tail comprises a error checking and a correction code. There may several different data packets present in the above system-on-chip, namely for memory access requests, for cache coherence synchronization, for data fetch, for data update and for IO and interrupts. Memory access request packets serve to request data from a shared memory and comprise a header with the destination address of a target memory and the requested memory operation. As no data is transported, the payload will be empty. The cache coherence synchronization packet is sent from an updated memory to all caches with a copy thereof. This packet may comprise data as payload if the data in the caches are to be updated or may comprise no data if the data in the caches are to be invalidated, wherein the header may comprise the particular operation type. The data fetch packet serves as a reply packet from a memory and contains the requested data as payload while the header contains the target address. The data update packet serve to write data back into a memory and contains the target address in the header and the respective data as the payload. The IO and the interrupt packet contains a header with the destination address and if a data exchange is involved the payload may contain the data. Accordingly, the content of the header as well as of the payload will depend on the transaction.

The above-mentioned operations like cache misses, data fetch, memory updates and cache synchronization involve a sending of data over the interconnect. However, sending packets over the interconnect result in an energy dissipation on the interconnect wires and in the logic gates inside each switch. When a data packet travels through the interconnect the interconnect wires and the logic gates along the data path will toggle if the data stream reverses its polarity. Accordingly, energy is consumed for each bit in the interconnect lines and in the logic gates.

In a multi-hop interconnect the packet data path may vary depending on the actual data traffic conditions. Packets with identical sources and destinations do not necessarily travel the same data path, i.e. the number of hops as well as the same actual path. However, the numbers of hops traveled by a packet will effect the energy dissipation of the data transport as every hop includes interconnect wires and a number of logic gates. For more information regarding the energy dissipation in systems on chip please refer to "Packetized On-Chip Interconnect Communication Analysis for MPSoC" by Ye et al. in Design Automation and Test in Europe, DATE 2003, Proceedings, page 344-349.

It is therefore an object in the invention to reduce the power consumption in a system-on-chip environment.

Therefore, an integrated circuit having a plurality of processing modules and an interconnect means for coupling said plurality of processing modules and for enabling a packet based communication based on transactions between said plurality of processing modules is provided. Each packet comprises a first predetermined number of subsequent words each having a second predetermined number of bits. A first of said plurality of processing modules issues a transaction by sending at least one packet over said interconnect means to a second of said plurality of processing modules. The integrated circuit further comprises at least one packet inspecting unit for inspecting bits of said at least one packet to determine bits not required for said issued transaction and for matching said not required bits of said at least one inspected packet with other bits of the same packet.

As the matching is preformed by other bits of one and the same packet, the energy loss associated to the switching of logical gates in a switch can be reduced along the entire data path through the interconnect, since the matching only depends on bits of the same packet, which do not change along the data path via the interconnect.

According to an aspect of the invention said at least one packet inspecting unit matches said not required bits with previous or following bits in the same packet. Thereby, the energy loss associated to the switching of logical gates in a switch when subsequent bits change their polarity can be reduced.

According to a preferred aspect of the invention said at least one packet inspecting unit matches said not required bits with corresponding bits in a previous or following word in the same packet. As the packets are arranged in subsequent words, this solution is easy to implement.

According to a further preferred aspect of the invention said integrated circuit comprises at least one network interface associated to said first of said plurality of processing modules for controlling the communication between said first of said plurality of processing modules and said interconnect means. Each of said at least one packet inspecting units is arranged in one of said network interfaces. As the header of the packet as well as its payload is present in the network interface associated to the first processing module and the bits of the packet will not change along their data path through the interconnect, the network interface is the preferred place to perform the matching of the unused bits.

The invention also relates to a method for packet switching control in an integrated circuit having a plurality of processing modules and an interconnect means for coupling said plurality of processing modules and for enabling a packet based communication based on transactions between said plurality of processing modules. Each packet comprises a first predetermined number of subsequent words each having a second predetermined number of bits. A first of said plurality of processing modules issues a transaction by sending at least one packet over said interconnect means to a second of said plurality of processing modules. Bits of said at least one packet are inspected to determine bits not required for the issued transaction and said not required bits of said at least one inspected packet are matched with other bits of the same packet.

Further aspects of the invention are described in the dependent claims.

These and other aspects of the invention are apparent from and will be elucidated with reference to the embodiment(s) described hereinafter.

Figures 3A, 3B:
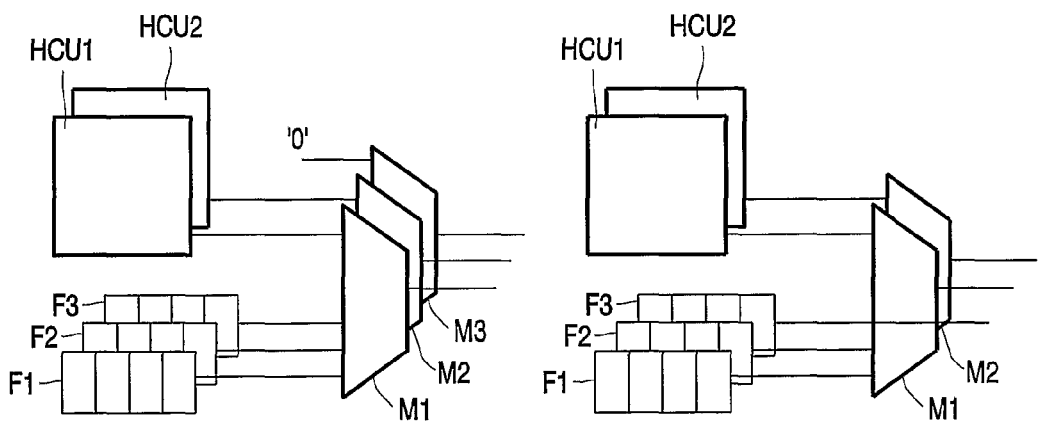
Figure 2A:
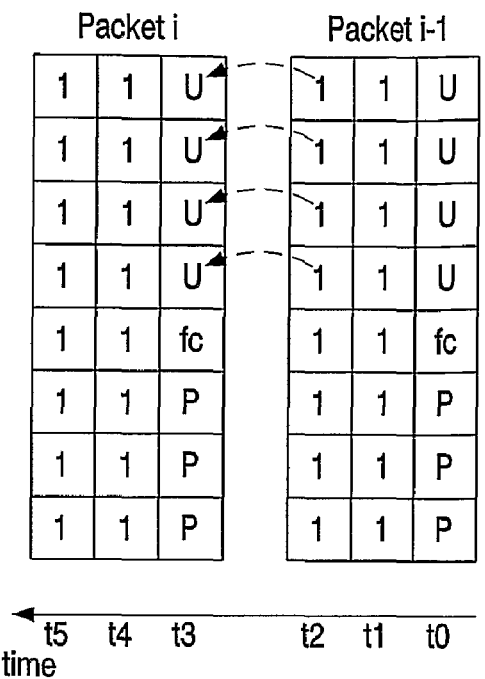
Figure 2B:
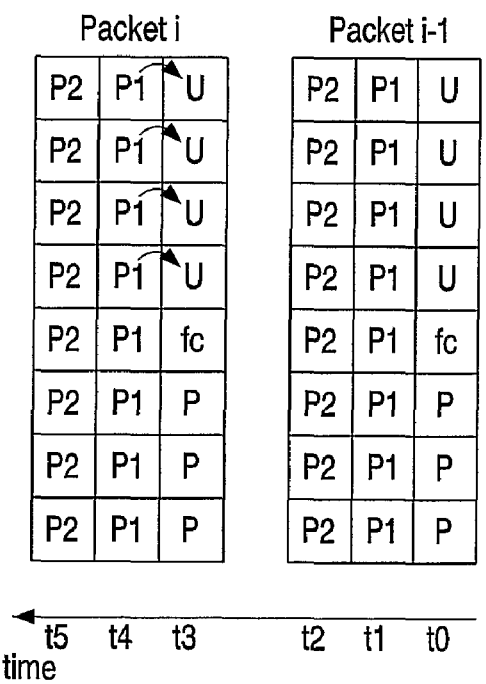

FIG. 1 shows a basic block diagram of a network on chip according to the invention FIGS. 2A and 2B shows the basic structure of packets used in the invention, and FIGS. 3A and 3B show a basic block diagram of a packet inspecting unit according the prior art and according to the invention.

The following embodiments relate to systems on chip, i.e. a plurality of modules on the same chip communicate with each other via some kind of interconnect. The interconnect is embodied as a network on chip NOC. The network on chip may include wires, bus, time-division multiplexing, switch, and/or routers within a network. At the transport layer of said network, the communication between the modules are performed over connections. A connection is considered as a set of channels, each having a set of connection properties, between a first module and at least one second module. For a connection between a first module and a single second module, the connection comprises two channel, namely one from the first module to the second channel, i.e. the request channel, and a second from the second to the first module, i.e. the response channel. The request channel is reserved for data and messages from the first to the second, while the response channel is reserved for data and messages from the second to the first module. However, if the connection involves one first and N second modules, 2*N channels are provided. The connection properties may include ordering (data transport in order), flow control (a remote buffer is reserved for a connection, and a data producer will be allowed to send data only when it is guaranteed that space is available for the produced data), throughput (a lower bound on throughput is guaranteed), latency (upper bound for latency is guaranteed), the lossiness (dropping of data), transmission termination, transaction completion, data correctness, priority, or data delivery.

The modules as described the following can be so-called intellectual property blocks IPs (computation elements, memories or a subsystem which may internally contain interconnect modules) that interact with network at said network interfaces NI. A network interface NI can be connected to one or more IP blocks. Similarly, an IP can be connected to more than one network interfaces.

FIG. 1 shows a basic block diagram of a network on chip according to a first embodiment. In particular, a master module M and a slave module S each with an associated network interface NI are depicted. Each module M, S is connected to a network N via its associated network interface NI, respectively. The network interfaces NI are used as interfaces between the master and slave modules M, S and the network N. The network interfaces NI are provided to manage the communication between the respective modules M, S and the network N, so that the modules can perform their dedicated operation without having to deal with the communication with the network or other modules. The network comprises a plurality of interconnected routers R. The routers R serve to forward commands and data to the next router R or to a network interface. For more details on the router architecture please refer to Rijpkema et al, "A Router Architecture for Networks on Silicon", Proceedings of Process 2001, 2nd Workshop on Embedded Systems, or "Trade Offs in the Design of a Router with Both Guaranteed and Best-Effort Services For Networks on Chip", by Rijpkema et al in Design, Automation and Test in Europe Conference and Exhibition (DATE'03) Mar. 3-7, 2003 Munich, Germany.

As the bandwidth of the network in the network-on-chips is usually fixed for all types of transactions and communications between the master and slave modules M, S, in certain cases some of the bits in a packet may not be required for the communication or a transaction. One example can be a memory access request as described above, since the payload of such a packet is empty. An alternative example of unused bits can be if a target or slave has an address range which needs less address bits as allocated in the header of the packet. The same may be applicable for the data in the payload.

Therefore, a packet inspecting unit PIU is arranged in the network interface NI associated to the master module M. The packet inspecting unit PIU serves to control the packet switching for packets sent from the master module M.

FIG. 2 shows the basic structure of packets used in the invention. In particular, FIG. 2A shows two packets followed by each other on a link and a packet switching based on a standard technique of matching of bits in two subsequent packets. FIG. 2B shows a preferred example of the packet and a packet switching based on a matching of bits within the same packet. In both Figs. unused bits are marked with 'U', 'p' corresponds to header bits related to the path, and 'fc' corresponds to the flow control, while may be piggy backed in the header. It should be noted that 'P' for path and 'fc' for flow control are merely examples. Alternatively, a destination address may be included.

The packets are each 8-bit wide and 3 words deep. However, other bit widths and word depths are also possible.

In FIG. 2A, the unused bits U in the packet i are matched against the previous corresponding bits in a word of a previous packet i−1. This is performed by making the unused bits U equal the previous bits, i.e. payload bits of the previous packet, as indicated by the dashed arrows in FIG. 2A. However, as the sequence of the packets may change at every router R along the path across the network, this matching must be performed for every router R along the path. Accordingly, a unit for controlling the packet switching may be implemented in every router, which will result in a cost intensive implementation.

An improved matching of unused bits according to a preferred embodiment is shown in FIG. 2B. Here, the matching is preferably performed in a network interface NI of a master module M from which the packet originates. Additionally or alternatively, the matching may be performed in the network interface NI of a slave module M As the header information of the packet as well as the payload is present in the network interface NI, the matching can be done therein. Since the packet and in particular the payload will not change during its path through the network N, the bits of the packet can be optimized to minimizing the power consumption by reducing the switching between bits of subsequent or previous words in a packet. Preferably, the matching is performed between bits of subsequent words, i.e. bits are matched to following bits. As the bits will not change during their path through the network, the intra packet switching sequence will be the same for all router R. In particular, the unused bits in the header of packet i, are matched against the p1 bits in the same packet.

FIG. 3 show a basic block diagram of a packet inspecting unit according the standard technique and according to the invention. In FIG. 3A a packet inspecting unit is shown which is based on keeping unused bits equal to zero, while FIG. 3B shows a packet inspecting unit PIU according to a preferred embodiment.

The packet inspecting unit PIU of FIG. 3A comprises three multiplexer M1-M3, a first and second header creation unit HCU1, HCU2 and three FIFOs F1-F3. The outputs of the first and second header creation unit HCU1, HCU2 are coupled to first inputs of the first and second multiplexer M1, M2, respectively. The second inputs of the first, second and third multiplexer M1-M3 are coupled to the first, second and third FIFOs F1-F3, respectively. The first input of the third multiplexer M3 is set to '0'. Alternatively, the first input is set to '1'.

The packet inspecting unit PIU of FIG. 3B comprises merely two multiplexer M1-M2, a first and second header creation unit HCU1, HCU2 and three FIFOs F1-F3. The outputs of the first and second header creation unit HCU1, HCU2 are coupled to first inputs of the first and second multiplexer M1, M2, respectively. The second inputs of the first, and second multiplexer M1-M2 are coupled to the first and second FIFOs F1-F2, respectively. The output of the third FIFO F3 together with the outputs of the first and second multiplexer M1, M2 are used as output of the packet inspecting unit PIU.

Therefore, in addition to the power reduction via reduce switching, the packet inspecting unit PIU according to the invention also has a lower implementation cost than an implementation; which keeps these unused bits fixed, as the multiplexing of the payload or unused (thus fixed) bits can be omitted. By saving one multiplexer and accordingly saving a specific amount of logical gates, the power consumption is further reduced, as less logical gates are required for switching and therefore less power is dissipated by switching. This is in vast contradiction to the implementation cost of the standard technique, for which additional multiplexers and flip-flops are necessary.

In an alternative embodiment, the matching techniques as described according to FIG. 2A and FIG. 2B may also be combined by performing the intra packet matching in a network interface before the packet travels through the network and by performing an inter packet matching in some of the routers R along its path through the network.

In a further alternative embodiment the above described intra and/or inter packet bit matching may also be performed in the routers R of the network N.

The reduced switching activity has a positive influence on the power consumption of several architectural components included in such a network like switches and FIFO as the switching of logic gates in these components.

The above described switching technique is advantageous as compared to known power-reduction techniques that try to reduce the switching activity by encoding/decoding the information on a bus. This is because such encoding/decoding techniques do not save any power for realistic bus lengths, as the power needed for encoder/decoder, i.e. the power needed for switching logic gates in said encode/decoder, is to high.

An alternative approach to handle unused bits is to keep them equal to 0 or 1. However, this may introduce additional packet switching, like (1-0-1) and is therefore not desired.

While in the above embodiments the interconnect has been described as a network comprising routers, other multi-hop interconnects may also be possible.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. Integrated circuit having a plurality of processing modules (M, S) and an interconnect means (N) for coupling said plurality of processing modules (M, S) and for enabling a packet based communication based on transactions between said plurality of processing modules (M, S), wherein each packet comprises a first predetermined number of subsequent words each having a second predetermined number of bits, wherein a first of said plurality of processing modules (M) issues a transaction by sending at least one packet over said interconnect means to a second of said plurality of processing modules (S), comprising:
    at least one packet inspecting unit (PIU) for inspecting bits of said at least one packet to determine bits not required for said issued transaction and for matching said not required bits in a header of said at least one inspected packet related to a path over said interconnect with corresponding bits of a following word within the same packet.

2. Integrated circuit according to claim 1, further comprising:
    at least one network interface (NI) associated to said first of said plurality of processing modules (I) for controlling the communication between said first of said plurality of processing modules (I) and said interconnect means (N), wherein each of said at least one packet inspecting units (PIU) is arranged in one of said network interfaces (NI).

3. Method for packet switching control in an integrated circuit having a plurality of processing modules (M, S) and an interconnect means (N) for coupling said plurality of processing modules (M, S) and for enabling a packet based communication based on transactions between said plurality of processing modules (M, S), wherein each packet comprises a first predetermined number of subsequent words each having a second predetermined number of bits, wherein a first of said plurality of processing modules (M) issues a transaction by sending at least one packet over said interconnect means to a second of said plurality of processing modules (S), comprising the steps of:
    inspecting bits of said at least one packet to determine bits not required for the issued transaction and updating said not required bits of said at least one inspected packet with corresponding bits of a following word of the same packet, wherein said unused bits are related to a path over said interconnection.

* * * * *